United States Patent [19]

Harada et al.

[11] 4,113,379
[45] Sep. 12, 1978

[54] ILLUMINATION APPARATUS FOR ELECTRONIC COPYING MACHINES

[75] Inventors: Masaaki Harada; Tsuguto Fujita, both of Ebina, Japan

[73] Assignee: Rank Xerox, Ltd., London, England

[21] Appl. No.: 816,773

[22] Filed: Jul. 18, 1977

[51] Int. Cl.² .................. G03B 27/54; G03B 27/76
[52] U.S. Cl. .................................... 355/71; 355/70
[58] Field of Search .............. 355/8, 11, 67, 69, 70, 355/71

[56] References Cited

U.S. PATENT DOCUMENTS

| 3,312,143 | 4/1967 | Karow et al. | 355/70 |
| 3,630,614 | 12/1971 | Kazle et al. | 355/115 X |
| 3,698,815 | 10/1972 | Thomas | 355/8 X |
| 3,765,762 | 10/1973 | Lidonnici | 355/113 X |

Primary Examiner—Donald A. Griffin

[57] ABSTRACT

Illumination apparatus for electronic copying machines comprising a casing 1 having an elongated opening 5 extending in a longitudinal direction thereof wherein light sources 6 and 6' are disposed respectively at both ends of said casing 1, the inner surface of said casing 1 being formed as a diffusing reflection surface and a light screening plate 7 being provided so as to prevent direct emission of light through said opening 5 from said light sources 6 and 6'.

3 Claims, 3 Drawing Figures

ILLUMINATION APPARATUS FOR ELECTRONIC COPYING MACHINES

DETAILED DESCRIPTION OF THE INVENTION

This invention relates to an illumination apparatus, in particular, one for copying machines.

Fluorescent lamps or halogen lamps have heretofore been used as light sources for copying machines, the halogen lamps having the advantage that they provide more stable illumination than the fluorescent lamps.

But when illuminating large sizes of original papers (A3, B4) with a linear or elongated type of halogen lamp, the lamp consumes at least 300–400 watts more than the fluorescent type and they emit a great quantity of heat in addition to the desired illumination and result in undesirable thermal effects in the copying machines.

To improve this, a smaller wattage consuming halogen lamp illuminator is needed.

In view of and for overcoming the foregoing defects, a proposal has been made with an illumination apparatus wherein an elongated window is situated in such a way that reflected light is emitted out of the apparatus substantially over the entire length thereof and a pair of light sources are provided in the tube for shooting light from both ends of the tube. With such an apparatus, it is possible to reduce the emission of heat much lower than the halogen lamp in which a filament coil (coil element) is extended over the entire length of the apparatus.

The apparatus described above has however a defect that undesired unevenness results in the distribution of illumination due to non-uniform emitted amount of light such as direct light from a halogen lamp, reflected light from a mirror reflector and the like and further produces a problem that a great difference in the intensity of illumination is produced on the surface of an original sheet between both ends and middle areas when mirror reflectors or diffusion surfaces are utilized.

This invention has been made in view of the foregoing and it is therefore the object of this invention to provide an illumination apparatus for electronic copying machines capable of providing satisfactory distribution in illumination.

This invention is to be described referring to the preferred embodiment thereof as depicted in the drawings wherein.

Figure 1:
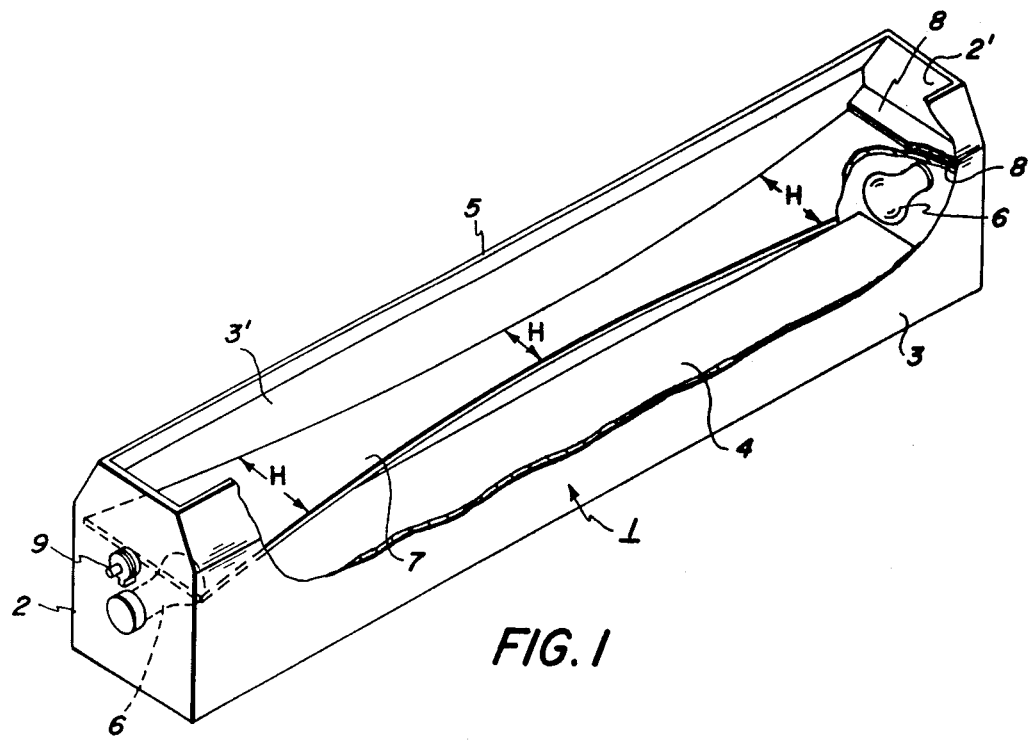
FIG. 1 is a partially cut away perspective of an illumination apparatus constituting the invention.
Figure 2:
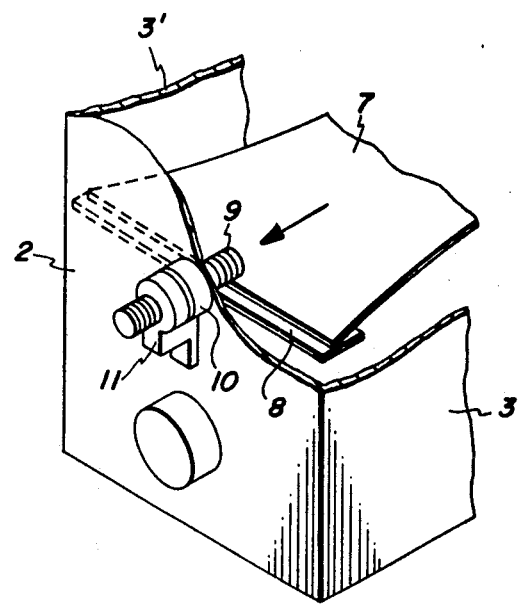
FIG. 2 is an enlarged perspective view for a portion thereof.

FIG. 1 is a perspective view of an illumination apparatus according to this invention wherein an elongated casing 1 is surrounded by side walls 2 and 2', 3 and 3' and a bottom wall 4 is provided with an elongated opening 5 extending longitudinally of the casing 1, and further provided with light sources 6 and 6' such as halogen lamps or the like provided in an opposing relationship to each other on the side walls 2 and 2' at the ends of the casing 1. A light screening plate 7 is provided so that light is not emitted directly from the light sources 6 and 6' through the opening 5. In this embodiment, the elongated light screening plate 7 has a shape such that its width H decreases from both longitudinal ends toward the central portion thereof and is symmetrical to the right and left of the center thereof. In other words, the plate 7 has a bow tie shape.

The light screening plate 7 is supported for movement along the longitudinal axis of the casing 1. More specifically, the light screening plate 7 is loosely held at one end thereof between a pair of upper and lower guide plates 8 projecting from the side wall 2' at one casing side and secured with a bolt 9 at the other end thereof. The bolt 9 is passed through the side wall 2 at the other casing side and, at the outside of the casing, it is provided with an adjusting nut 10, which is fixed by a retention arm 11 so as not to move in the rotational direction about the axis of the bolt 9. Another guide plate 8 for the light screening plate 7 is also provided on the side wall 2 at the other casing side.

The inner surface of the casing 1 forms a heat-resistant diffusing reflection surface made of enamel or ceramic coating or the like. The surface of the light screening plate 7 on the side of the light sources 6 and 6' may be formed either as a diffusing reflection surface or as a specular or mirror surface.

Figure 3:
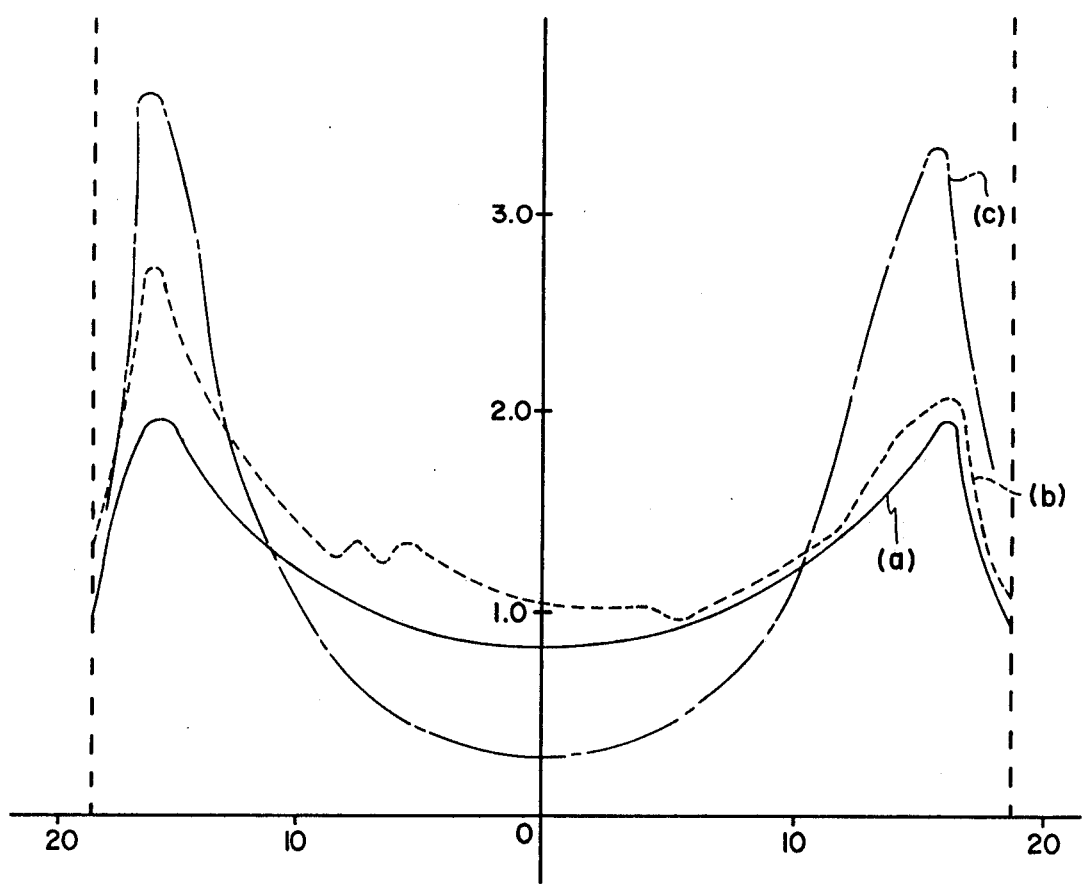
FIG. 3 is a set of graphic curves for the distribution in the illumination apparatus in the prior art and according to this invention.

The distribution of illumination obtained by the illumination apparatus having the foregoing construction is shown in FIG. 3 as curve $a$. Curves $b$ and $c$ are also shown in FIG. 3 for the sake of comparison. Curve $b$ shows the distribution of output light on the surface of an original sheet emitted from a conventional apparatus which produces direct light, mirror reflection light and diffusing reflection light from the tube of the illumination apparatus, in which partial unevenness in the intensity of illumination is observed for direct light and mirror reflected light. Curve $c$ shows a distribution in illumination with another conventional apparatus in which all of the areas of a reflection plate are made as a diffusing reflection plate. While it shows a smooth curve over the entire measured range, the difference in the intensity of illumination between both ends and central areas is extremely great.

Since the reflection surface is formed as a diffusing reflection surface made of enamel or ceramic coating or the like and an indirect illumination system is employed in the illumination apparatus of this invention, distribution in illumination is near ideal when the curve is smooth over the entire range and the difference in the intensity of illumination between the upper and the lower limits can be reduced by the increase in the amount of light in the central portion although a slight decrease in the intensity of illumination is observed at both ends as compared with the curves $b$ and $c$ above.

In addition, since the light screening plate 7 is adapted to be movable longitudinally with respect to the casing 1 by the rotation of the adjusting nut 10 unevenness in the intensity of illumination between left and right ends can be compensated with ease. The light screening plate 7 is not necessarily restricted to an integral sheet but can be provided separately on right and left sides so long as they can hinder the passage of direct light from the light sources through the opening 5.

This invention, having the structure as described above, can overcome the defects inherent to conventional illumination apparatus having light sources disposed at both ends of an elongated tube and thus provide advantageous effects giving smooth distribution in illumination with no unevenness and capable of reducing the difference in the distribution of the intensity of illumination between both ends and central areas.

What is claimed is:

1. Illumination apparatus for use in a reproduction machine, said apparatus comprising:
a casing having an elongated opening in one wall thereof;
illumination means disposed at opposite ends of said casing; and
means supported intermediate said elongated opening and said illumination means to preclude direct emission of illumination from said opening, said means being shaped so as to provide a substantially uniform distribution of illumination along said elongated opening, said means for precluding direct emission of illumination comprising a screen plate having the shape of a bow tie.

2. Apparatus according to claim 1 wherein said means for precluding direct emission of illumination is adjustably supported in said casing.

3. Apparatus according to claim 2 including a pair of guide plates for supporting one end of said screening plate and at least one support plate for the opposite end thereof, said apparatus further including a bolt attached to the end of said screenining plate adjacent said at least one support plate and means operatively associated therewith for effecting longitudinal shifting of said screening plate.

* * * * *

UNITED STATES PATENT AND TRADEMARK OFFICE
CERTIFICATE OF CORRECTION

PATENT NO. : 4,113,379
DATED : September 12, 1978
INVENTOR(S) : Masaaki Harada; Tsuguto Fujita It is certified that error appears in the above-identified patent and that said Letters Patent are hereby corrected as shown below:

On the title page the following should be added:

-- [30] Foreign Application Priority Data
July 21, 1976    Japan ........51-96107 --.

Signed and Sealed this

Fifth Day of June 1979

[SEAL]

Attest:

RUTH C. MASON
Attesting Officer

DONALD W. BANNER
Commissioner of Patents and Trademarks